Nov. 24, 1959   E. L. KLAVITTER   2,914,760
REMOTE CONTROL INDICATING SYSTEM
Filed April 9, 1956   2 Sheets-Sheet 1

INVENTOR.
Ernest L. Klavitter
BY
Harness, Dickey & Pierce
ATTORNEYS

Nov. 24, 1959   E. L. KLAVITTER   2,914,760
REMOTE CONTROL INDICATING SYSTEM
Filed April 9, 1956   2 Sheets-Sheet 2
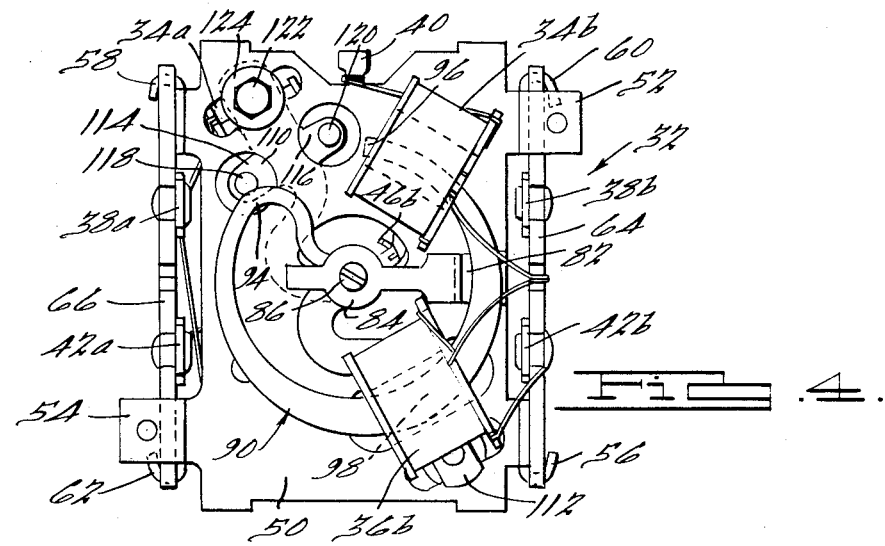
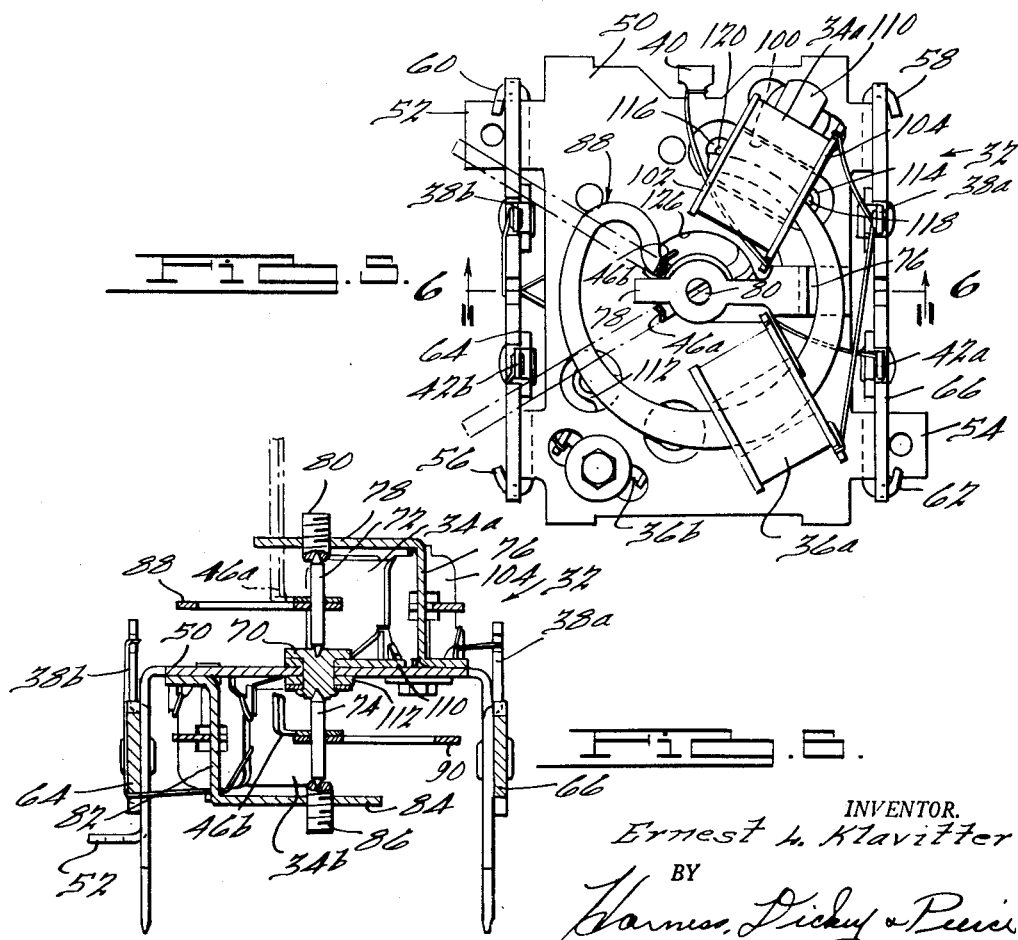
INVENTOR.
Ernest L. Klavitter
BY
Harness, Dickey & Pierce
ATTORNEYS United States Patent Office 2,914,760
Patented Nov. 24, 1959

2,914,760

REMOTE CONTROL INDICATING SYSTEM

Ernest L. Klavitter, Ypsilanti, Mich., assignor to King-Seeley Corporation, Ann Arbor, Mich., a corporation of Michigan Application April 9, 1956, Serial No. 577,054

8 Claims. (Cl. 340—378)

This invention relates to remote control indicating devices and systems.

The principles of the invention are exemplarily embodied in an apparatus for indicating the instant position of a remote device. The inventive features are representatively applied to the representing, at a distant point, of the position of a shaft which is integral with or controls an element or accessory of an automobile, although it will be appreciated that the gauging structure herein disclosed is applicable in diverse other fields.

The object of this invention is to improve devices for providing an indication of the position or condition of an instrumentality remote therefrom.

A feature of this invention is a dual gauging device.

Another feature of this invention is a springless gauging device adapted automatically to return to an initial position.

Another feature of this invention is an improved adjusting means for a gauging device.

The manner of accomplishing the foregoing object, the nature of the foregoing features, and other objects and features of the invention, will be perceived from the following detailed description of an embodiment of the invention when read with reference to the accompanying drawings in which:

Fig. 4 is a rear elevational view of the structure of Fig. 3;

Fig. 5 is a front elevational view of the structure of Fig. 3; and

Fig. 6 is a sectional view taken substantially along the line 6—6 of Fig. 5.

Figure 1:
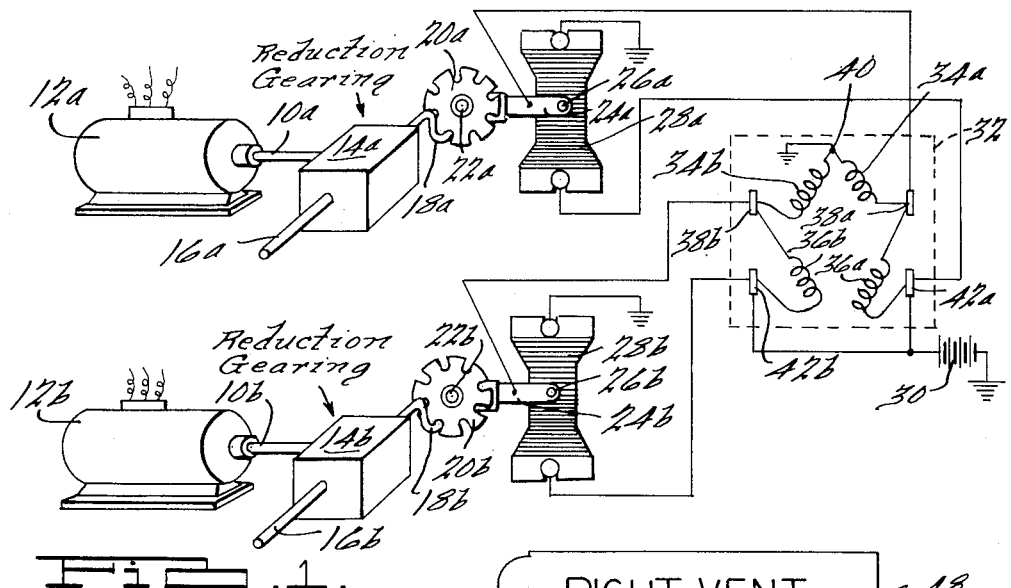
Figure 1 is a schematic representation of a system embodying the principles of the present invention.

The gauging or remote indicating device embodying the principles of the present invention is representatively disclosed as an element of a system for indicating the instant position of two air-intake vents on an automobile, in combination with a remote-control system for adjusting the positions of those vents. Referring first to Fig. 1 of the drawings, the output shafts 10a and 10b of bidirectional D.C. motors 12a and 12b are connected to drive reduction gearing units 14a and 14b. One end of each of the double ended output shafts 16a and 16b of the reduction gearing units 14a and 14b is employed to move apparatus (not shown) such as the representative left and right air vents, respectively, on an automobile. It will be appreciated that the disclosed gauging device need not be associated with automobiles, and, if so associated, may be employed in conjunction with any other movable element on the vehicle the position or condition of which is desired to be sensed.

The other end of each of the double-ended shafts 16a and 16b is bent to define a crank portion 18a or 18b engageable with a notch in the periphery of a rotor 20a or 20b rotatably mounted upon a shaft 22a or 22b essentially coaxial with the shaft 16a or 16b. An arm 24a or 24b, insulated from ground, is mechanically secured to the rotor 20a or 20b so as to be rotated therewith. Contact 26a or 26b on arm 24a or 24b is adapted to engage a resistance element 28a or 28b. Elements 28a and 28b are representatively of the type comprising a resistance wire wound upon an insulating card, and constitute, in conjunction with the arms and contacts, sender assemblies.

One terminal of each of the resistance units 28a and 28b is connected to one terminal of the source of power 30, the other terminal of which is grounded. Source of power 30, represented as a battery, may constitute the generator-regulator-battery-ignition-switch system of an automobile. Since the other terminal of each of the resistance units 28a and 28b is connected to ground, each of the units 28a and 28b is effectively connected across the source of power 30. Hence, each of the sender assemblies, such as the assembly including arm 24a, contact 26a and resistance unit 28a, serves as a variable voltage divider, the potential difference between arm 24a and ground or battery varying as a function of the position of the rotor 20a and hence as a function of the position of the object being controlled through the medium of the reduction gearing shaft 16a.

Each of the units of the dual-unit gauging assembly 32 comprises a pair of coils serially connected across the source of power, one of those units including coils 34a and 36a, and the other of those units comprising coils 34b and 36b. Arm 24a is electrically connected to the point of junction 38a of coils 34a and 36a while arm 24b is electrically connected to the point of junction 38b of coils 34b and 36b.

As will be seen, the two coils comprising each cooperating pair of coils, such as coils 34a and 36a, act differentially and in opposition to one another upon an armature structure. The magnitude of the current through those cooperating coils is determined by the position of the associated variable voltage divider or sender assembly. For example, if contact 26a is moved to the extreme upper end of the resistance element 28a, the junction 38a between coils 34a and 36a is effectively at ground potential so that there will be no current through coil 34a and a maximum current through coil 36a; conversely, if contact 26a is moved to the lowermost end of resistance element 28a, junction 38a will be effectively at full battery potential so that there will be no current in coil 36a and full current in coil 34a. Assuming, for example, the resistance of windings 34a and 36a to be equal, if contact 26a is in the shown mid position on the resistance element 26a, equal currents will flow through coils 34a and 36a. It will be perceived that under the foregoing assumptions, at any intermediate position of contact 26a, the gauging device including coils 34a and 36a will be insensitive to variations in the magnitude of the voltage across the supply 30 since a change in the magnitude of that voltage, in either direction, will produce equal changes in the currents through coils 34a and 36a. At either extreme position of contact 26a, this compensating effect does not exist, but, as will be seen, at either of those extreme positions the armature has been moved to a limit position, in either direction. Therefore, by designing coils 34a and 36a so that they produce adequate flux at the lowest expected voltage of source 30 to move the armature to the limit position, variations in the magnitude of that voltage will not produce any change in the armature position at these limit points.

In the disclosed representative arrangement, it is assumed that shaft 16a is connected to shift the position of the left-hand vent door of an automobile between an open and closed position and that shaft 16b is adapted similarly to affect the position of the right-hand vent door of an automobile. The instant position of the shaft 16b, and therefore of the right-hand vent door, is represented by the position of the pointer 46b relative to the dial 48 (Fig. 2), and the instant position of shaft 16a, and therefore the position of the left-hand vent door, is represented by the position of pointer 46a relative to the dial 48.

Considering now the details of the indicator device construction as represented in Figs. 3 to 6 of the drawings, the primary structural member is a mounting plate 50 provided with a pair of diagonally opposed rearwardly extending mounting legs terminating in mounting flanges 52 and 54. Plate 50 is also provided with two additional, opposed depending legs carrying tabs 56 and 58 which cooperate with tabs 60 and 62, respectively, on the mounting legs to clasp terminal plates 64 and 66, respectively, formed of insulating material. A pair of electrical terminals 38b and 42b is secured to terminal plate 64 by riveting or otherwise, and a pair of terminals 38a and 42a is secured to terminal plate 66 in a similar manner. These terminals are similarly designated in Fig. 1 of the drawings.

A bearing 70 (Fig. 6) is staked or otherwise secured in position in a central aperture in the mounting plate 50 and is provided with a tapered socket in its forward and rear faces to accept coaxially disposed forward and rear pointer staffs 72 and 74. A forward bridge member 76, welded or otherwise secured to the mounting plate 50, is provided with a portion 78 lying in spaced parallelism with mounting plate 50 and carrying an adjustable end bearing 80 for the forwardmost end of the pointer staff 72. Similarly, a bridge 82 is provided with a portion 84 extending parallel to the mounting plate 50 but on the opposite side thereof from the bridge portion 78, and carrying an end bearing 86 for the other pointer staff 74.

A forward armature 88 is fixed to and rotatable with pointer staff 72 and a rear armature 90 is fixed to and rotates with pointer staff 74. In their preferred form, the armatures 88 and 90 are generally arcuate or C-shaped. Each of these armatures comprises a unitary strip of magnetizable metal one end of which is supported, as noted, by the pointer staff, and the major portion of which extends in a generally arcuate path. From an electromagnetic standpoint, the armature could be a complete ring with one or more supporting spokes, but it is highly advantageous from the standpoints of manufacture and assembly for the armature to be unitary and open, the open arc being at least equal in length to the width of the electromagnetic coils to which the armature is to be assembled. The armature is provided with a continuously varying cross-sectional area over its arcuate portion. Thus, referring to armature 90 represented in Fig. 4 of the drawings, the cross-sectional area of the arcuate portion of the armature is at a minimum at the ends generally designated 94 and 96, and the cross-sectional area smoothly increases to a maximum at a central point generally designated 98. It will be observed that in the representative form disclosed the inner edge of the armature is arcuate, the outer edge being non-arcuate to a sufficient degree to provide the requisite change in the cross-sectional area between minimum and maximum values.

The position of armature 88 is controlled by electromagnetic coils 34a and 36a and the position of armature 90 is controlled by electromagnetic coils 34b and 36b. Each of those coils comprises a plurality of turns of wire wound upon a form. The coil form upon which coil 34a is wound, representative of the others, comprises a tubular body defining a longitudinal central aperture 100 and two spoolheads 102 and 104.

Coils 34b (Fig. 4) and 36a (Fig. 5) are fixed in position on the mounting plate 50 in any suitable fashion. As an example, referring to Fig. 3 of the drawings, a pin 106 may be secured to each of the spoolheads of each of the coils so that they do not block the tubular aperture 100 through the coil. These pins extend through and are secured in apertures in the mounting plate 50.

Means are provided for adjusting the position of coils 34a (Fig. 5) and 36b (Fig. 4). In the disclosed arrangement, this is accomplished by securing each of those coils upon an individual calibrating arm, coil 34a being secured to a calibrating arm 110 and coil 36b being secured to calibrating arm 112. As may best be seen in Fig. 6 of the drawings, calibrating arms 110 and 112 are pivotally secured to the mounting plate 50 by the bearing 70. Each of those calibrating arms extends from that pivotal axis towards one corner of the mounting plate 50. In the shown arrangement, the calibrating arms have a serpentine portion to provide clearance for the movement of the pointers, as will be perceived when the course of motion of the pointers is noted hereinafter. Arm 110 is provided with two laterally extending projections 114 and 116 (Figs. 4 and 5) each of which is apertured to accept one of the pins 118 and 120, respectively, secured to the spoolheads 104 and 102, respectively, of the coil form for coil 34a. These pins are staked or otherwise secured to the calibrating arm 110. The end of calibrating arm 110 remote from its pivotal axis is provided with a tapped aperture accepting a screw 122 provided with a washer 124, the head of the screw 122 and the washer 124 being disposed on the opposite face of the mounting plate 50 from the calibrating arm 110 to provide a means for locking the calibrating arm in any selected position. Since the screw 122 passes through an elongated aperture in the mounting plate 50, the position of coil 34a may be adjusted to calibrate the instrument. Coil 36b is similarly supported and similarly adjustable.

Figure 2:
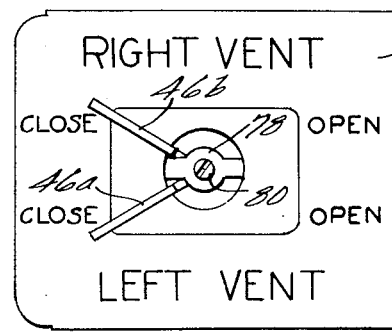
Fig. 2 is a front elevational view of the gauging device employed in the system of Fig. 1.
Figure 3:
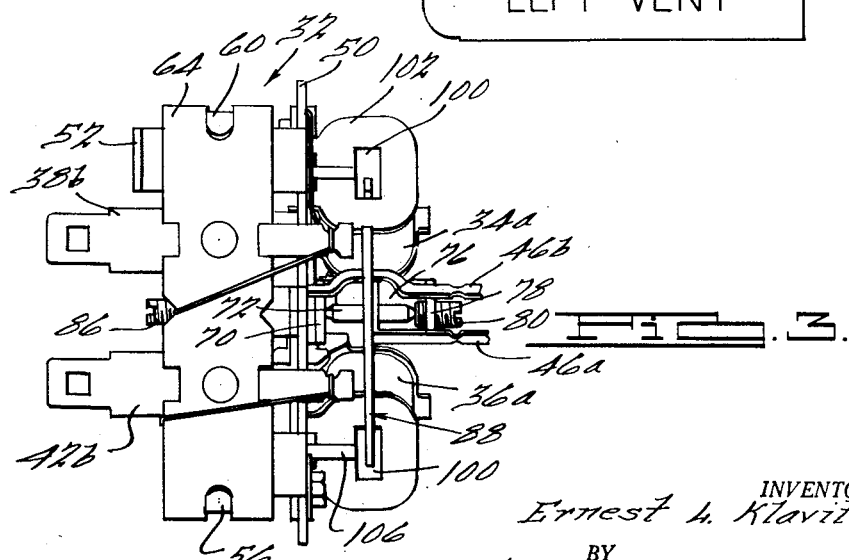
Fig. 3 is a side elevational view of the gauge of Fig. 2 with the cover removed.

As may best be seen in Figs. 2 and 6 of the drawings, the lower pointer 46a is secured to the pointer staff 72 and moves with the forward armature 88 while the upper pointer 46b is secured to pointer staff 74 and moves with the rear armature 90. Pointer 46a extends forwardly to a point forward of the bridge 78 (Fig. 5) and is then bent so that the portion thereof which is visible in Fig. 2 extends generally parallel to the mounting plate 50. The pointer 46b extends upwardly through an arcuate slot 126 in the mounting plate 50, and is bent so that the portion thereof which is visible in Fig. 2 is approximately parallel to the mounting plate 50 and hence, approximately parallel to the dial 48 (Fig. 2). It will be observed that pointer 46b is provided with an offset portion so that it will clear the forward armature 88 in any position of that armature.

Considering the operation of the represented apparatus with particular reference to Fig. 5 and in the light of the previous description of the operation of the system of Fig. 1, when coil 34a is fully energized and coil 36a is deenergized as a result of contact 26a having been moved downwardly to the lowermost end of the resistance element 28a, coil 36a will exert no effective force upon the armature 88 but coil 34a will exert forces upon armature 88 tending to rotate that armature about its axis until a minimum reluctance condition is achieved, that is, until further motion in either direction of the armature 88 would result in an increase in the reluctance of the magnetic path. This condition is achieved when the portion of the armature 88 which has the greatest cross-sectional area is centered within coil 34a. As a result of this movement, pointer 46a will be rotated in a counterclockwise direction (Figs. 2 and 5) to a maximum deflection position, labeled "open" in the view of Fig. 2. If, conversely, contact 26a (Fig. 1) is moved upwardly so that arm 24a is at ground potential, coil 34a will produce no effective forces upon armature 88 whereas coil 36a will exert a maximum force, bringing the armature 88 approximately to the position represented in the drawings. At any intermediate position of contact 26a (Fig. 1), both coils 34a and 36a will exert forces upon the armature 88 so that the point of maximum cross-sectional area of that armature will assume a position between those coils, that position being determined by the relative magnitudes of the two opposing forces. As an example, if the coils 34a and 36a are effectively identical and if equal currents are passing therethrough, the point of maximum cross-sectional area of the armature 88 will be positioned approximately midway between the centers of those coils.

The electromagnetic structure comprising coils 34b and 36b and armature 90 operates in a similar fashion to control the position of pointer 46b.

It will be appreciated that the zero position of each of the units in the gauging assembly may be adjusted by bending the pointer 46a or 46b and that the scale may then be calibrated by adjusting the position of coil 34a or 36b in the manner before-described.

It will be observed that in the disclosed orientation of the device, the center of gravity of the armature 88 or 90 per se is below the pivotal axis of that armature when both coils are deenergized. This fact may be utilized to provide an automatic return of the armature, and of the pointer moving therewith, to a zero position upon de-energization of the coils independently of the provision of any counterweights or springs. Thus, in the representative arrangement disclosed, the pointers 46a and 46b are so positioned that they will strike a portion of the leg 78 of the bridge 76 at their zero positions. The apparatus is so oriented that the gravitational forces upon the armatures 88 and 90 will return the indicators 46a and 46b to that limit position. If desired, other stop means may be provided, the provision of stop members on the indicator dial 48 itself, as an example, possessing the merit that it is insured thereby that the indicator 46a or 46b will be pointing at the zero or maximum positions on the dial.

While it will be apparent that the embodiment of the invention herein disclosed is well calculated to fulfill the object of the invention, it will be appreciated that the invention is susceptible to modification, variation and change without departing from the proper scope or fair meaning of the subjoined claims.

What is claimed is:

1. An electromagnetic device comprising a mounting plate, a pair of gauging mechanisms disposed on opposite sides of said plate, an indicator dial disposed in spaced parallelism with said plate, a pointer for each of said mechanisms having a portion extending generally perpendicularly to said mounting plate and a second portion extending generally parallel to said indicator dial, said first portion of one of said pointers extending through an aperture in said mounting plate, and means for supporting said pointers for rotation about a common axis.

2. An electromagnetic device comprising a mounting plate, a pair of gauging mechanisms disposed on opposite sides of said plate, an indicator dial disposed in spaced parallelism with said plate, a pointer for each of said mechanisms having a portion extending generally perpendicularly to said mounting plate and a second portion extending generally parallel to said indicator dial, said first portion of one of said pointers extending through an aperture in said mounting plate, said second portions of said pointers being substantially coplanar with one another, and means for supporting said pointers for rotation about a common axis.

3. An electromagnetic device comprising a mounting plate having an aperture therein, a pair of gauging mechanisms disposed on opposite sides of said plate and each including a pointer staff, the longitudinal axes of said pointer staffs being aligned with one another and perpendicular to said plate, a pointer for each of said mechanisms mounted upon the respective ones of said pointer staffs, each of said pointers having a first portion extending generally perpendicularly to said mounting plate and a second portion extending generally parallel to said mounting plate, said first portion of one of said pointers extending through said aperture, said second portions of said pointers being substantially coplanar with one another.

4. An electromagnetic device comprising a mounting plate, a pair of gauging mechanisms disposed on opposite sides of said plate, each of said mechanisms comprising a staff the longitudinal axis of which is aligned with that of the staff of the other of said mechanisms, an armature supported by said staff and having a generally arcuate portion the cross-sectional area of which varies continuously along the length thereof, the cross-sectional area reaching a limit value at a point between the extremes of said portion, a pair of spaced-apart electromagnetic coils surrounding portions of said armature, the portion of said armature at which the cross-sectional area reaches a limit value being positionable between said coils, and a pointer for each of said mechanisms mounted upon the respective ones of said staffs, each of said pointers having a portion which is substantially co-planar with a corresponding portion of the other of said pointers, and means for mounting said device so that the force exerted by at least one of the coils of each two of each said coils is opposed by the gravitational force acting upon the armature individual thereto.

5. An electromagnetic device comprising a unitary elongated armature having a generally arcuate portion having a cross-sectional area which varies continuously along a major portion of the length thereof and reaches a limit value at a point between the extremes of said arcuate portion and having a spoke portion integral with and extending from one end of said arcuate portion and terminating in an apertured portion lying within a circle defined by said arcuate portion, means engaging the aperture in said spoke portion for pivotally supporting said armature for rotation about an axis, two spaced-apart magnetic flux producing winding means both disposed around said arcuate portion and to one side of said spoke portion for exerting opposing forces tending to move said armature in different directions about said axis, and means including a source of voltage for modulatingly and differentially energizing said winding means for conjointly controlling and modulating the position of said armature in accordance with the differential energization of said two winding means.

6. The combination of claim 5 further including calibrating arm means pivotal about said axis and supporting one of said winding means for movement along a portion of the length of said armature and through an arc about the axis.

7. The combination of claim 5 in which the resultant force exerted on said armature by said winding means is opposed by the gravitational force acting upon said armature.

8. The combination of claim 7 further including stop means for establishing a zero position of said armature at the position at which said limit value portion of said arcuate portion is disposed within one of said winding means, the center of gravity of said armature being spaced from the lowermost section of said arcuate portion at said zero position of said armature.

References Cited in the file of this patent

UNITED STATES PATENTS

| 1,048,200 | Noble | Dec. 24, 1912 |
| 1,717,653 | Berge | June 18, 1927 |
| 1,653,947 | Decker | Dec. 27, 1927 |
| 2,053,826 | Hallerberg | Sept. 8, 1936 |
| 2,633,566 | Oliwa | Mar. 31, 1953 |